No. 733,745. PATENTED JULY 14, 1903.
G. C. RALSTON.
MECHANISM FOR OPERATING BULKHEAD OR OTHER DOORS.
APPLICATION FILED AUG. 29, 1902.
NO MODEL. 5 SHEETS—SHEET 1.
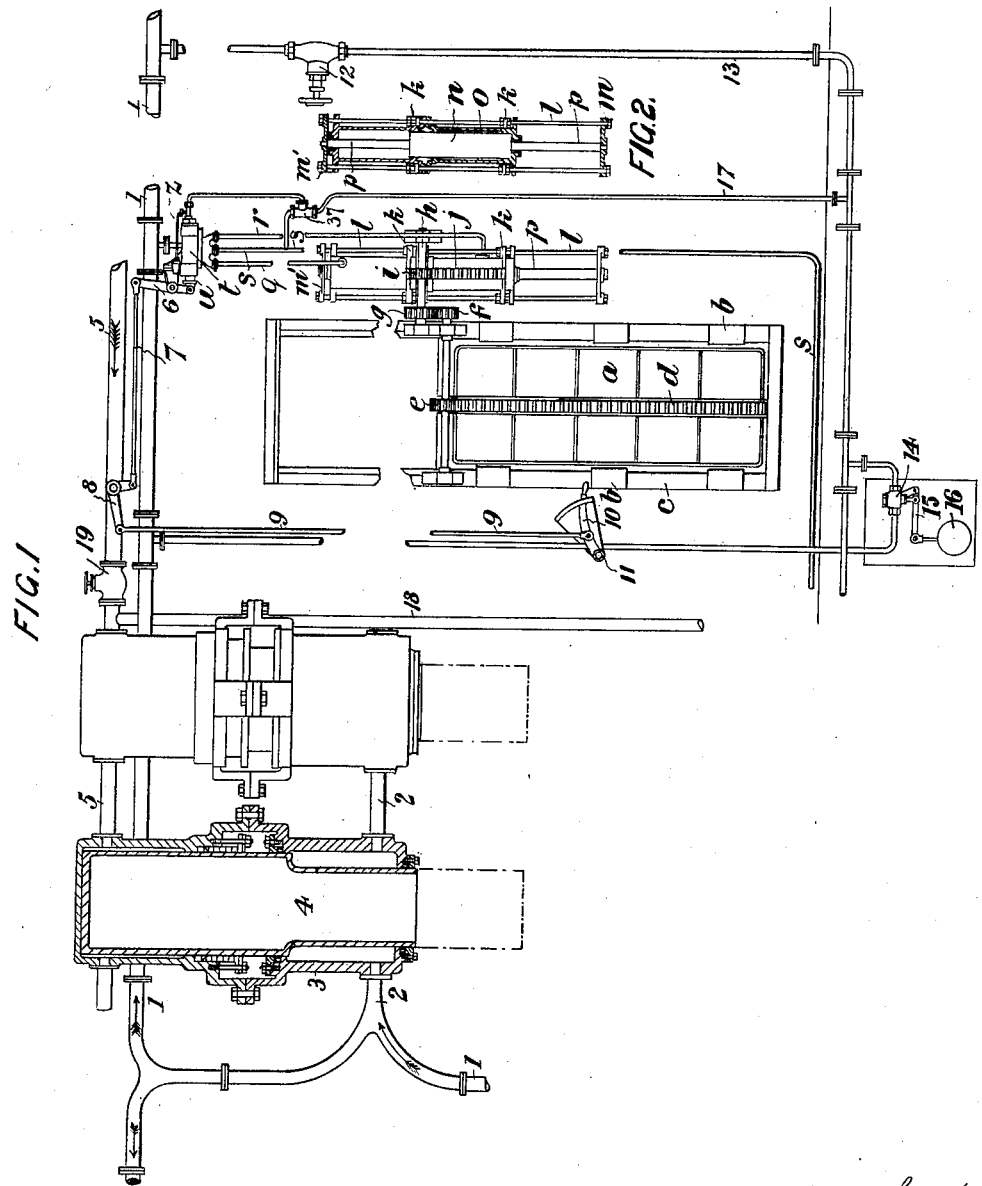

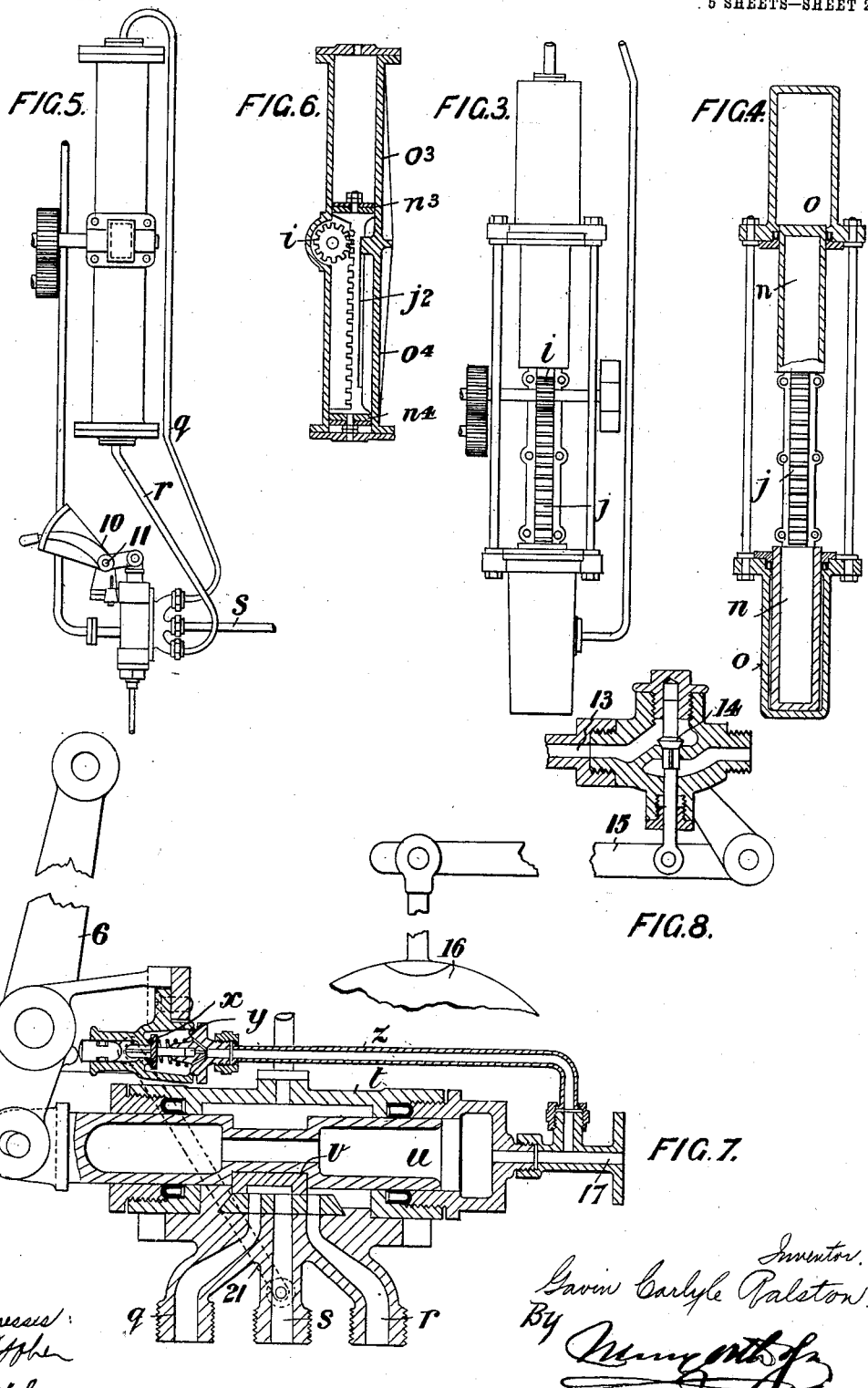

No. 733,745. PATENTED JULY 14, 1903.
G. C. RALSTON.
MECHANISM FOR OPERATING BULKHEAD OR OTHER DOORS.
APPLICATION FILED AUG. 29, 1902.
NO MODEL. 5 SHEETS—SHEET 3.
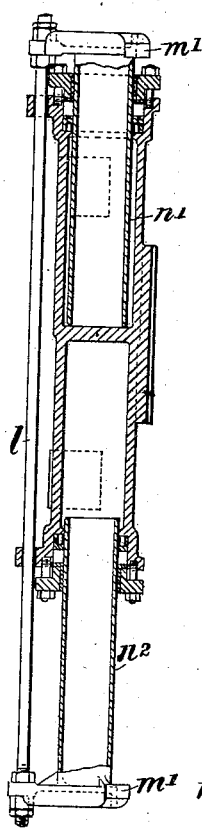
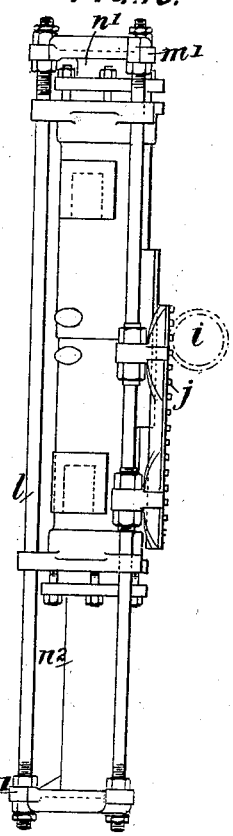
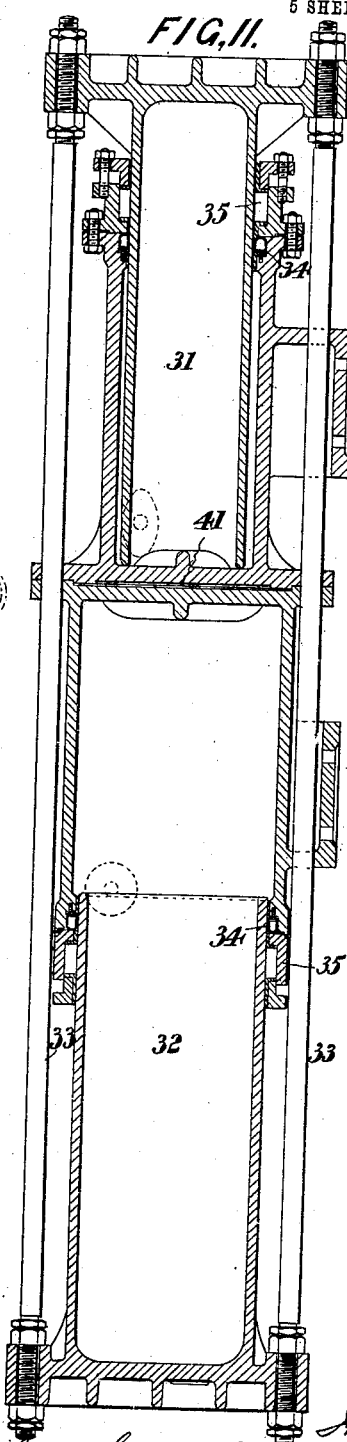

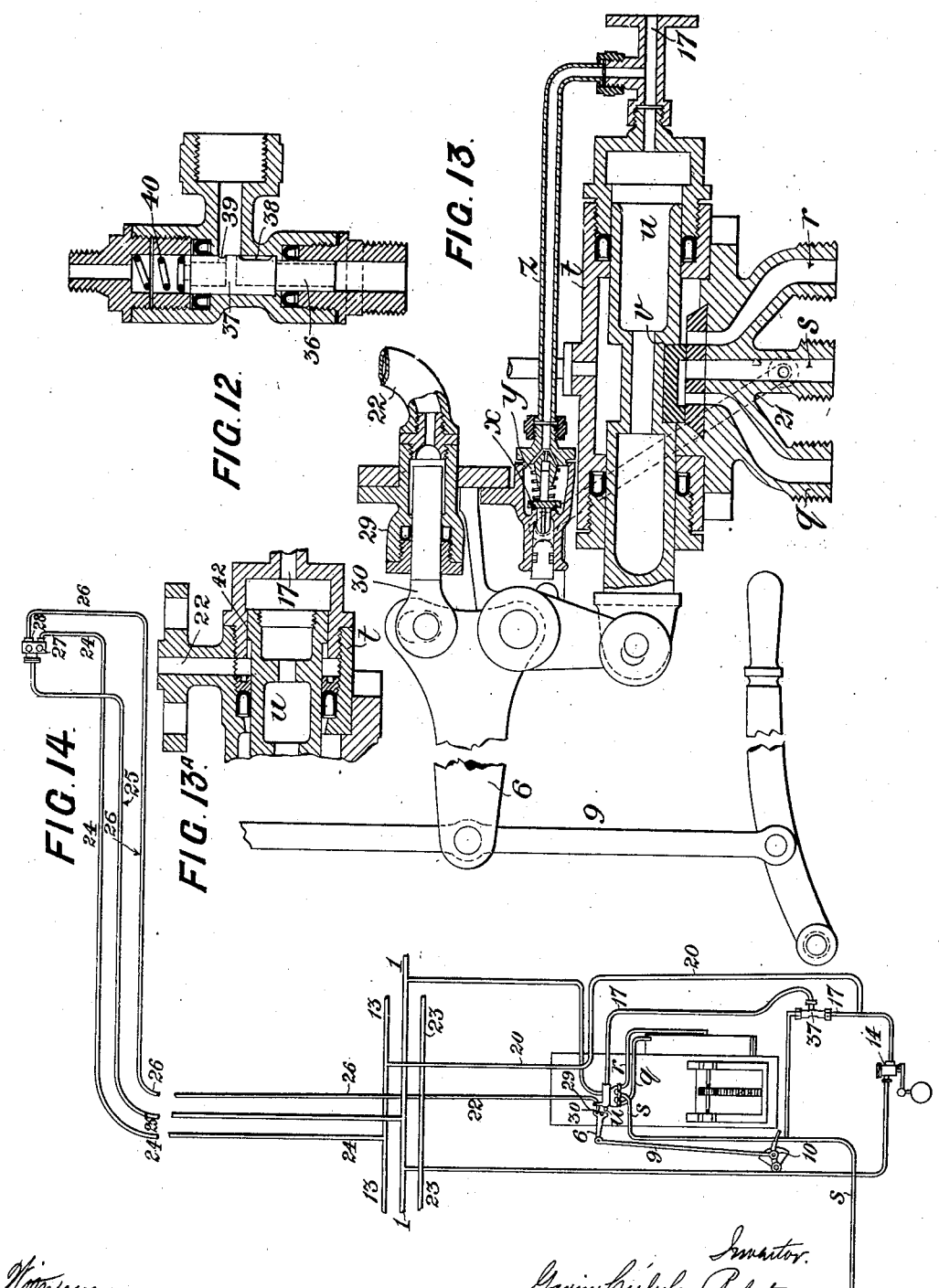

No. 733,745. Patented July 14, 1903.

UNITED STATES PATENT OFFICE.

GAVIN CARLYLE RALSTON, OF LONDON, ENGLAND, ASSIGNOR TO J. STONE AND COMPANY, OF DEPTFORD, ENGLAND.

MECHANISM FOR OPERATING BULKHEAD OR OTHER DOORS.

SPECIFICATION forming part of Letters Patent No. 733,745, dated July 14, 1903.

Application filed August 29, 1902. Serial No. 121,527. (No model.)

*To all whom it may concern:*

Be it known that I, GAVIN CARLYLE RALSTON, engineer, a subject of the King of Great Britain and Ireland, residing at 11 Springbank Gardens, Hither Green, London, England, have invented new and useful Improvements in Mechanism for Operating Bulkhead-Doors or other Doors, of which the following is a specification.

These improvements form a complete system whereby all the bulkhead-doors in a ship or other structure can be closed simultaneously by hydraulic power from the bridge, engine-room, or other place by the opening of a valve and whereby the door or doors in any compartment immediately after all the doors have been simultaneously closed from the bridge or immediately after the doors only in said compartment have been closed automatically by the inrush of water from any cause—such as a collision, grounding, shot, ramming, or torpedoing, or in case of failure of the fluid-pressure gear—can be opened by a man from within such compartment in order that any men happening to remain shut up within the same may be able to escape hurriedly therefrom, whereupon such door or doors will close automatically after them. The means for rendering such an escape possible consists in an emergency store of power which can be applied or rendered available by an emergency-valve at each door operated by a handle at either side of a bulkhead. Means are also, if desired or required, provided for the simultaneous opening of all the doors. Such a requirement obtains more particularly in war-ships.

Figure 15:
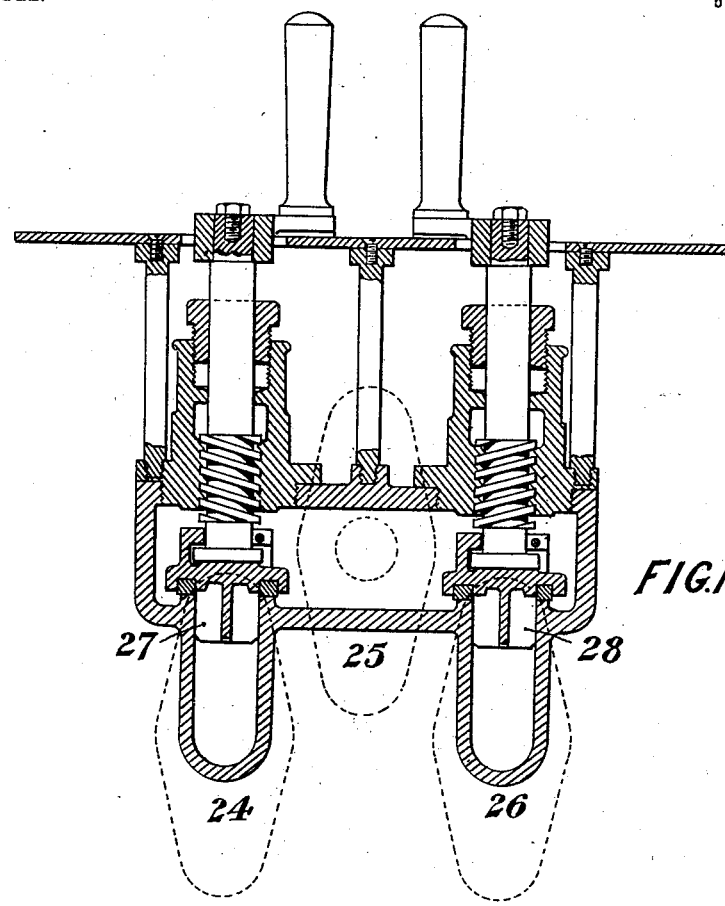
Figure 16:
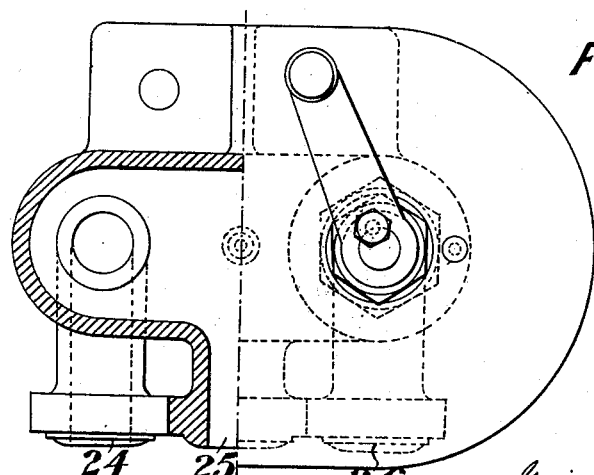

Figure 1 is a diagrammatic side view of the system as applied in a ship, but to one door only, although they all will be connected thereto in like manner, and showing one form of door-operating hydraulic cylinder. Fig. 2 is a vertical section of that cylinder. Figs. 3 and 4 are side view and vertical section of another form of hydraulic cylinder. Figs. 5 and 6 are front view and vertical section of another form of same. Fig. 7 is a sectional elevation of the emergency-valve. Fig. 8 is a sectional elevation of a valve which in case of the rupture of the skin of the vessel causes the bulkhead-doors in that part of the ship to close automatically. Fig. 9 is a sectional elevation, and Fig. 10 a side view, of another form of door-operating hydraulic cylinder. Fig. 11 is a sectional elevation of another form of accumulator. Fig. 12 is a sectional elevation of a valve for preventing the creeping on of hydraulic pressure, and the consequent uncontrolled closing of the doors in case of leakage. Fig 13 is a sectional elevation of an emergency-valve device which is used when it is desired not only to be able to close all the doors from the bridge or other point, but also to open them from that point. Fig. 13$^A$ is a part view showing a modified form of Fig. 7. Fig. 14 shows the arrangement of pipes for that case, and Figs. 15 and 16 are sectional elevation and plan of the controlling-handles on the bridge.

$a$, Fig. 1, is a bulkhead-door which in this example and in other examples to be described hereinafter is arranged to slide up and down; but the construction of the operating parts remains substantially the same for doors that are made to slide horizontally or to doors turning on a central vertical or other pivot. The door may, as shown, have wedge-pieces that in the closed position are under wedge-cleats $b$ on the fixed frame $c$, and thereby gradually in the descent of the door press its face tightly against a packing-ring in a well-known manner.

$d$, Fig. 1, is a tooth-rack fixed on the door, and $e$ a pinion gearing therewith. Its spindle also carries a pinion $f$, which gears with a wheel $g$ on a spindle $h$, that also carries a pinion $i$, which gears with a tooth-rack $j$. This latter is fixed to two cross-heads $k$, that are connected to the piston-ram $n$ of a hydraulic cylinder $o$, which is fixed to the bulkhead.

$q$ is the pipe for admitting water under pressure to the upper end of the cylinder, and $r$ is the pipe to the lower end. The piston-rods $p$ $p$ are by preference of slightly-unequal diameters, so that the area on the door-opening side of the piston is slightly greater than the area on the other side in order to overcome the initial friction of the door if tightly wedged. The pipes $q$ and $r$ lead to the pressure-distributing emergency-valve. (Shown to a larger scale in Fig. 7, wherein $s$ is the exhaust-pipe therefrom.)

$t$ is a cylinder with a ram $u$, which at its inner end works in a packing of dermatine or the like and at its outer end passes through a similar packing. The ram is in the middle reduced in diameter and there fitted with a slide-valve $v$, working on a face with ports to the pipes $q$, $r$, and $s$. The cylinder $t$ is in the middle part connected with the hydraulic-pressure pipe 1, which receives its supply from a special pumping-engine or from the boiler-feed pump, which latter in the case of a collision would stop when the propeller-engine stopped. $x$ is a relief-valve the under side of which, by a pipe $z$, is connected with the space at the end of the ram, while its upper side is connected with the exhaust-pipe $s$ by a pipe 21. (Shown in dotted lines.) A spring $y$ assists to hold the valve $x$ closed.

From the pipe 1, which passes along the ship through the bulkhead, pipes 2 branch off to the lower end of one or more or many store cylinders or accumulators 3, (one such for the doors in several bulkheads,) fitted with piston or trunk 4, which is smaller in diameter in the lower part that by the pipe 2 communicates with the hydraulic-pressure pipe 1 than in the upper part, which, by the pipe 5, communicates with the boiler, (the steam-pressure being assumed about half that of the hydraulic pressure.) The steam-pressure thus applied to the accumulator forms a store of power which can be made use of in an emergency—that is to say, for again opening a door or doors in a compartment, but only for a few moments, after all the doors have been closed from the bridge, engine-room, or other place. The stop-valve 12, here as an example shown in the engine-room, is the valve for admitting hydraulic pressure to all the cylinders $o$ for closing all the doors simultaneously by admitting hydraulic pressure to the bottom of the ram $u$, Fig. 7. The emergency-valve ram $u$ can also be operated by a lever 6, rod 7, bell-crank lever 8, rod 9, and handle 10. There is such a handle at each door $a$ and its spindle 11 is, moreover, provided with a handle on the opposite side of the door, so that the emergency-valve ram $u$ can be operated from either side of the bulkhead.

Figs. 3 and 4 show another arrangement of door-operating gear, consisting of two cylinders $o$ $o$ with rams $n$ and $n$, which are connected by a tooth-rack $j$, that gears with the pinion $i$, as in Figs. 1 and 2.

Figs. 5 and 6 show another arrangement where a door-operating cylinder has two pistons $n^3$ and $n^4$, which work in the two ends $o^3$ and $o^4$ of same and are united by a rack $j^2$, that engages with a pinion $i$, as in Figs. 1 and 2. The pipes $q$ and $r$ are connected with an emergency-valve, Fig. 7, which in this case, as an example, is placed near the door, with the handles 10 on spindle 11. In Figs. 9 and 10 the door-operating cylinder really consists of two cylinders combined endwise and with a ram $n'$ and $n^2$ passing out at each end, where they are united by rods $l$, fixed to cross-heads $m'$. Two of the rods carry a tooth-rack $j$, which gears with the pinion $i$.

The stop-valve 12, Fig. 1, which on one side connects with the pressure-pipe 1 from the pump and accumulators 3, is on the other side by a pipe 13 connected with the lower side of a valve 14. (Shown to a larger scale in Fig. 8.) This valve is by a lever 15 (or by compound levers) connected with a float 16, placed in a perforated box in the bilge of each compartment, so that in case of the inrush of water by the rupture of the skin in that part of the vessel the float 16 rises and opens the valve 14, whereby hydraulic pressure is admitted to the end of the ram $u$ of the emergency-valve, Fig. 7, by the pipe 17, so as to close the doors in that compartment.

In Fig. 11 is shown another form of accumulator consisting of two cylinders 31 and 32, fixed end for end to each other with a small central air-space between them for insulating the heat of the steam in the cylinder 32 from the water in the cylinder 31. This space is open at each side, as shown at 41, or in several such places to admit a free current of air thereto. The cylinders are fixed together by four rods 33. Each ram works through cup-leather packing 34 and stuffing-box packing 35. The cylinder 32 is connected with the steam-pipe 5 and the cylinder 31 with the pressure-pipe 1 from the pump.

The action of the apparatus shown in Fig. 1 is as follows: The valve 12 is opened if all the doors are to be closed simultaneously. This valve may be in the engine-room, as here shown, or on the bridge or in any other suitable part of the ship. Any men that happen to be shut up in any compartment will now be able to open a door again by lifting the handle 10, whereby the relief-valve $x$, Fig. 7, is first opened, so that the water-pressure on the bottom of the ram $u$ is relieved through the pipe $z$. By further raising of the handle the ram $u$ is forced in or depressed, whereby the slide-valve $v$ opens to the pipe $q$, leading to the cylinder $o$, and opens the door by causing the piston $n$ to be depressed, the pressure-water from the pipe $r$ escaping to the exhaust-pipe $s$. This action takes place because as the cylinder $o$, when it was closed, had taken away its proportion of water from the lower part of the accumulator 3 and the pipe 2, the steam in the pipe 5 will follow up the receding accumulator-ram and the water in the lower part of the accumulator and enable the pipe $q$ and the cylinder $o$ to be charged with pressure-water. When the last man has left the compartment and let go the handle 10 on the other side of the compartment, the handle will drop, because the ram $u$ will by the pressure in the pipe 17 be forced out again.

I may also, if desired, and in order to better preserve the packings in the accumulators 3, Fig. 1, connect the steam-pipes 5 with the feed-pipe to the boilers by a pipe 18, in which case I provide a back-pressure valve 19 in the steam-pipe 5. By this means the steam will not be in direct contact with the interior of the accumulator shown in Fig. 1, but will act upon the feed-water as intermediary between the pressure-valve 19 and the accumulator. The purpose of the valve 19 is to prevent the feed-water from entering the steam-space of the boiler.

The valve, Fig. 12, has for its object to prevent the creeping on of hydraulic pressure and the consequent uncontrolled closing of the doors in case of leakage. For this purpose the valve is inserted in the pipe 17. The ram 36 is hollow, of a smaller diameter below, and with a cross-partition 37. It has a port 38 and a port 39 and is loaded with a helical spring 40. The upper outlet is connected with the exhaust-pipe s. In the position shown there is no hydraulic pressure in the pipe 17, and the spring 40 has forced the ram down to the position shown. When the full pressure is on in pipe 17, the ram 36 is up and the port 38 is fully open and the exhaust cut off. If after the pressure has been cut off to the ram u, Fig. 13, pressure should leak through, say, from the valve 27 or from a leaky part of the emergency-valve, then such pressure would enter the exhaust from the lower part of pipe 17 either by way of the slightly-opened port 38 and port 39 into the exhaust or by way of the port 39 into the exhaust.

In some cases it is useful to have a ready means of simultaneously opening all the doors from one point—say the captain's bridge. This applies especially to war-ships, where during a battle the utmost freedom should be afforded for the crew below deck to pass freely and rapidly from one compartment to another for the purposes of stoking, trimming, transport of shot and shell from the magazine to the guns on deck, and for the engineer officers to have full control of their subalterns. For this purpose the emergency-valve, Fig. 7, has a part added thereto, as shown in Fig. 13. (See also the arrangement of pipes, Fig. 14, and the door opening and closing controlling handles, Figs. 15 and 16, on the bridge.) 29 is a small additional cylinder fitted with a ram 30, which is connected to the lever 6. The under side of the ram communicates by the pipe 22 with the pipe 23, that runs along through the compartments and terminates at the first and the last bulkhead-doors. From the pipe 23 a pipe 26, which may be called the "opening-pipe," runs to a valve 28 on the bridge, (see Figs. 15 and 16,) where it can be operated by the captain for opening all the doors. At the same place there is a valve 27, which can be operated by the captain for closing all the doors. This latter valve communicates by the pipe 24 with the pipe 13 and the pipe 20, which latter joins the pipe 17. The pipe 13 runs along through the compartments and terminates at the first and last bulkhead-doors.

Fig. 13<sup>A</sup> shows a modification of the emergency-valve, Fig. 7, for adapting it to the opening of all the doors, as by the arrangement Fig. 13. The ram u is in this case enlarged in diameter at 42, and a connection is made above this enlargement with the pipe 22. The ram 30, Fig. 13, is then not needed, as the pressure coming upon the annular area of the part 32 forces the ram u in, when the valve 28 on the bridge is opened, so that in this case also all the doors are opened thereby.

The action is as follows: When the valve 28 is opened, the pressure from the main pipe 1 is admitted to the pipes 26, 23, and 22, thereby forcing the small ram 30, Fig. 13, in or up, thus reversing the lever 6 and forcing down the ram u, thereby admitting the pressure through pipe q to all the cylinders o at the bulkhead-doors and opening all the latter. On the other hand, when the valve 27 is opened the pressure is admitted from pipe 25 to valve 27 and through pipes 24, 13, and 20 to pipe 17, thereby forcing the ram u out and the ram 30 in, the slide-valve v being at the same time reversed, so that the pressure can enter the pipe r to the cylinder o at each bulkhead-door, thereby closing them all. The means for reopening any door after it has been closed is effected, as described, by the emergency-levers 10, and that whether the closing had been effected intentionally from the bridge or whether accidentally, owing to the failure of the pressure-producing pumps, or, in case the feed-pumps were used for producing the pressure, when they stop working in case the propeller-engines were stopped, as in case of an impending collision, or whether the closing had been effected automatically by the inrush of water.

What I claim as my invention, and desire to secure by Letters Patent, is—

1. In a bulkhead-door-operating installation consisting of a pump, a hydraulic accumulator, cylinders supplied with water-pressure therefrom, connections between the cylinder-pistons and the doors for operating the latter, valve devices (the emergency-valve) for distributing said pressure to the cylinder-pistons, and a valve operated from the bridge, in the engine-room, or other part of the ship for effecting the simultaneous closing and opening of all the doors, a pipe connection between the accumulator and the steam-boiler, a handle at each door and connections between the same and the said emergency-valve whereby, after the doors have been closed by the aforesaid valve from the bridge, any men inclosed behind the closed bulkhead-doors, can, by operating the aforesaid handle again open communication between the partly-exhausted accumulator and the door-cylinder so as to open said door, the steam from the boiler following up the receding ram and water in the accumulator, and whereby when the men have escaped and let go the handle the door closes of itself again.

2. In a bulkhead-door-operating installation consisting of a pump, a hydraulic accumulator, cylinders supplied with water-pressure therefrom, connections between the cylinder-pistons and the doors for operating the latter, valve devices for distributing said pressure to the cylinder-pistons, a valve operated from the bridge, the engine-room or other part of the ship for effecting the simultaneous closing and opening all the doors, a pipe connection between the accumulator and the steam-boiler, a handle at each door, connections between the same and the said distributing valve devices, a back-pressure valve in said pipe and a pipe from said pipe to the boiler feed-pipe, for the purpose of preventing direct contact between the steam and the accumulator-packings.

3. Bulkhead-doors, hydraulic cylinders for effecting the closing and opening of same, an accumulator for supplying said cylinders with water-pressure, a pump for supplying water-pressure to one end of the accumulator, a pipe from the boiler for supplying pressure to the other end of same, valve devices for distributing the water-pressure to the cylinder-pistons and a valve for admitting water-pressure from the accumulator to the distributing-valve device, said accumulator having a ram of smaller effective area at the water-pressure end than at the steam-pressure end.

4. In a bulkhead-door-operating system a distributing-valve device or emergency-valve consisting of a cylinder having a central chamber which communicates with the main water-pressure supply-pipe and which has a slide-valve face with ports to pipes that lead to the ends of door closing and opening cylinders and to an exhaust, a ram working out through packing at one end of the cylinder said ram fitted with a slide working on said slide-valve face, the other end of the cylinder communicating with a branch pipe from the starting-valve on the main water-pressure pipe, a relief-valve for relieving the pressure on the bottom of the ram, a pipe between the relief-valve and the exhaust, and a handle connected to the ram for opening said relief-valve, thereby opening communication, by way of the last-named pipe, between said branch pipe and the exhaust and then for moving the ram and thereby the slide-valve so as to move the door.

5. In a bulkhead-door-operating system the combination of a float in the bilge of the ship, a lever connected thereto, a valve connected to the lever, the upper side of said valve communicating with the main water-pressure supply-pipe and the lower side communicating with a branch pipe from the starting-valve on the main water-pressure pipe, a door-operating cylinder and a hydraulic ram with slide-valve device for distributing water-pressure to the door-operating cylinder, said device connected with the main pressure-pipe and with the aforesaid branch pipe from the starting-valve, for the purpose of operating the valve device so as to close the door when the float rises by the inrush of water into the bilge, substantially as set forth.

6. In a bulkhead-door-operating system, the combination of two door-operating cylinders opposite each other, a toothed rack between them fixedly connecting the pistons of said cylinders, and gearing between the toothed rack and a like rack on the door, substantially as set forth.

7. In a bulkhead-door-operating system the combination of two separate door-operating cylinders, with piston-packing between them, a piston common to both, a cross-head at the end of each piston-rod, rods uniting said cross-heads, two intermediate cross-heads fixed on said rods, a tooth-rack fixed to said last-named cross-heads, and tooth-wheel gearing between the tooth-rack and the door, substantially as set forth.

8. A combined bulkhead-door closing and opening system worked by hydraulic power and steam consisting of a pump, a plurality of hydraulic accumulators each with ram or piston having one side, the smaller of the two, exposed to the comparatively high hydraulic pressure from said pump, and the other side which is proportionally larger in area exposed to the comparatively low pressure of steam from a boiler, a plurality of bulkhead-doors for each accumulator, a cylinder with piston for each door, pipes for leading hydraulic pressure to each side of said piston, gear from said piston for closing and opening the door, a distributing-valve device connected to said pipes, to an accumulator and to an exhaust, and having also a relief-valve to the exhaust, a main hydraulic-pressure pipe from the accumulators, a starting-valve for admitting hydraulic pressure therefrom to close the bulkhead-doors, a pipe from the said valve to the several valve devices and a pipe from each of the latter for the main pressure-pipe a steam-pipe from the boiler to the main pressure-pipe, a back-pressure valve on said steam-pipe, and a handle near each door for operating the valve device, substantially as set forth.

9. A combined bulkhead-door closing and opening system working by hydraulic power and steam, consisting of a pump, a plurality of hydraulic accumulators each with ram or piston having one side, the smaller of the two, exposed to the comparatively high pressure from said pump, and the other side which is proportionally larger in area exposed to the comparatively low pressure of steam from a boiler, a plurality of bulkhead-doors for each accumulator, a cylinder with piston for each door, pipes for leading hydraulic pressure to each side of said piston, gear from said piston for closing and opening the door, a distributing-valve device connected to said pipes, to an accumulator and to an exhaust and having also a relief-valve to the exhaust, a main hydraulic-pressure pipe from the accumulators, a pipe therefrom to the feed-pump, a starting-valve for admitting hydraulic pressure therefrom to close the bulkhead-doors, a pipe from said valve to the several valve devices and a pipe from each of the latter to the main pressure-pipe, a steam-pipe from the boiler to the main pressure-pipe, a back-pressure valve on said steam-pipe, and a handle near each door for operating the valve device, substantially as set forth.

10. In a bulkhead-door closing and opening system a valve device consisting of a cylinder having a central chamber which communicates with the main water-pressure supply-pipe and which has a slide-valve face with ports to pipes that lead to the ends of the door closing and opening cylinders and to an exhaust, a ram working out through packing at one end of the cylinder, said ram fitted with a slide working on said slide-valve face, the other end of the ram having an enlargement, said end of the cylinder communicating with a door-closing branch pipe from the main pressure-pipe, the ring area of said enlargement communicating with a door-opening valve on the bridge, a relief-valve for relieving the pressure on the bottom of the ram, a pipe between the relief-valve and the exhaust, and a handle connected to the ram, for opening said relief-valve, thereby giving communication between the end of the ram and the exhaust and then for moving the ram and thereby the slide-valve so as to move the doors, substantially as set forth.

11. A combined bulkhead-door closing and opening system worked by hydraulic power and steam, consisting of a pump, a plurality of hydraulic double-cylinder accumulators, said cylinders arranged end for end, a ram or piston for each, the smaller of the two cylinders exposed to the comparatively high hydraulic pressure from said pump, and the other which is proportionately larger in area exposed to the comparatively low pressure of steam, tie-rods connecting said rams, a plurality of bulkhead-doors for each accumulator, a cylinder and piston for each door, pipes for leading hydraulic pressure to each side of said piston, gear from said piston for closing and opening the door, a distributing-valve device connected to said pipes, to an accumulator and to an exhaust, and having also a relief-valve to the exhaust, a main hydraulic-pressure pipe from the accumulators, a starting-valve for admitting hydraulic pressure therefrom to close the bulkhead-doors, a pipe from the said valve to the several valve devices and a pipe from each of the latter for the main pressure-pipe, a steam-pipe from the boiler to the main pressure-pipe, a back-pressure valve on said steam-pipe, and a handle near each door for operating the valve device, substantially as set forth.

12. In a bulkhead-door-operating system, the combination with the door-operating cylinders, of a distributing-valve device for admitting pressure to said cylinders, a pipe for admitting pressure to said valve device for operating it, a pipe from the said valve device to the exhaust, and a self-acting valve inserted between said pipes and consisting of a hollow ram with cross-partition, and a port on each side of said partition, an upper outlet loaded with a helical spring against the exhaust-pipe, a lower opening communicating with the lower lateral port, and a lateral opening communicating with the upper lateral port, said two last-named openings on the other hand communicating with the aforesaid pressure-admitting pipe, for the purpose of preventing water-pressure creeping on gradually to the said valve device from the starting-valve on the pressure-pipe in case of leakage of said starting-valve, substantially as set forth.

In testimony whereof I have signed my name to this specification in the presence of two subscribing witnesses.

GAVIN CARLYLE RALSTON.

Witnesses:
VICTOR JENSEN,
JOSEPH LAKE.